United States Patent [19]

Furuta et al.

[11] 4,409,473
[45] Oct. 11, 1983

[54] APPARATUS FOR DETECTING AN OBJECT

[75] Inventors: Naofumi Furuta, Konan; Kunio Ohi, Nagoya, both of Japan

[73] Assignee: Sunx Limited, Komaki, Japan

[21] Appl. No.: 336,186

[22] Filed: Dec. 31, 1981

[30] Foreign Application Priority Data

Jan. 9, 1981 [JP] Japan .................................. 56-2299
Jan. 13, 1981 [JP] Japan .................................. 56-4490
Mar. 5, 1981 [JP] Japan .................................. 56-31745

[51] Int. Cl.³ .......................................... H01J 40/14
[52] U.S. Cl. ................................. 250/206; 250/214 R
[58] Field of Search .................. 250/214 R, 206, 221, 250/222

[56] References Cited

U.S. PATENT DOCUMENTS 4,095,887 6/1978 van Herten et al. ........... 250/206 X

Primary Examiner—David C. Nelms
Assistant Examiner—Darwin R. Hostetter
Attorney, Agent, or Firm—Oblon, Fisher, Spivak, McClelland & Maier

[57] ABSTRACT

An optical type detector comprises a full-wave rectifier circuit to which input power source voltage arbitrarily selected is supplied, a switching regulator, a detecting section supplied with power from the switching regulator and optically detecting an object to output a detection signal, and a relay switch for performing switching operation in response to detection signal and producing a detection output corresponding to detection signal. The switching regulator includes a drive section which has two transistors connected in series with each other. When the input power voltage is applied, the two transistors divide the power voltage into substantially equal two parts.

9 Claims, 12 Drawing Figures

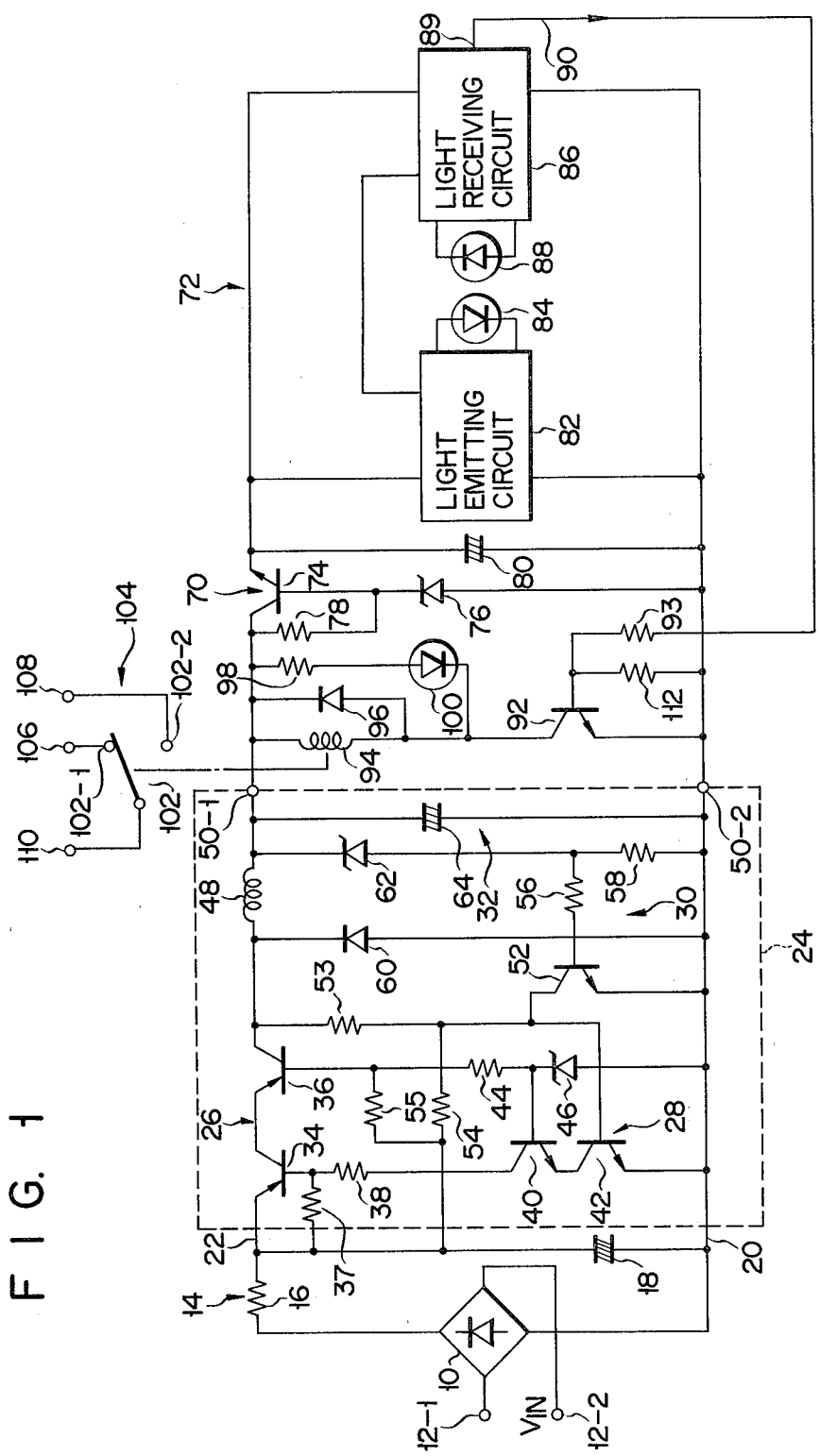

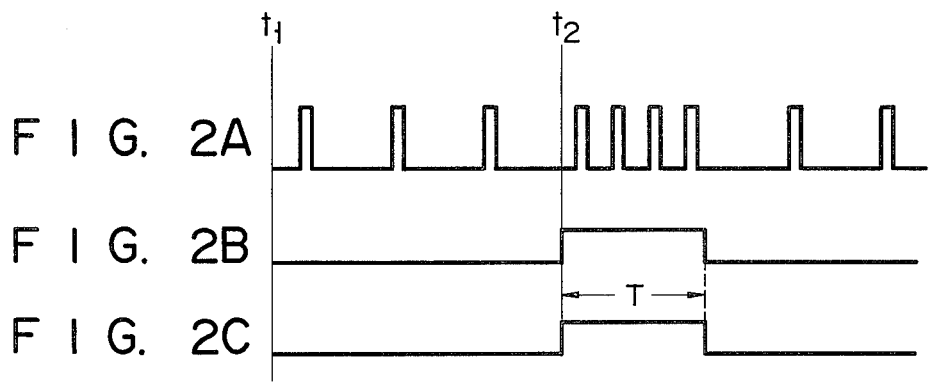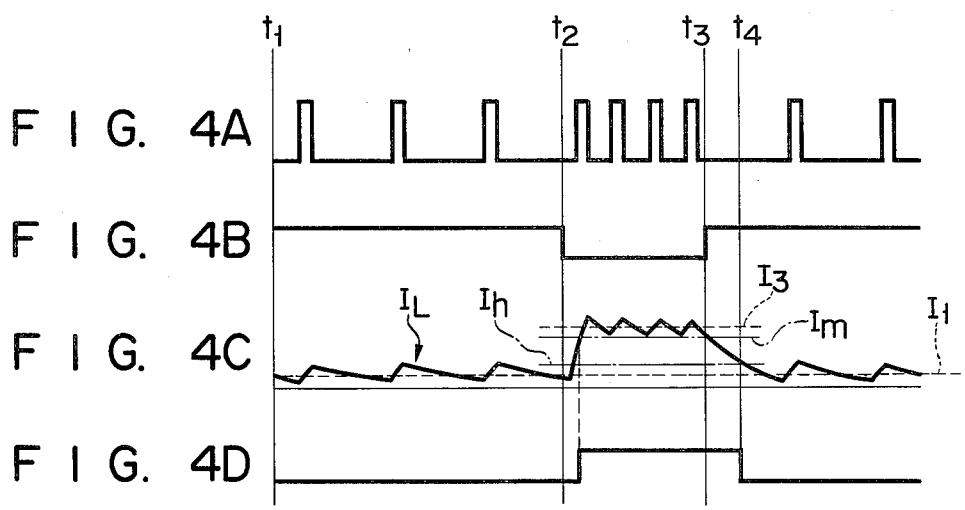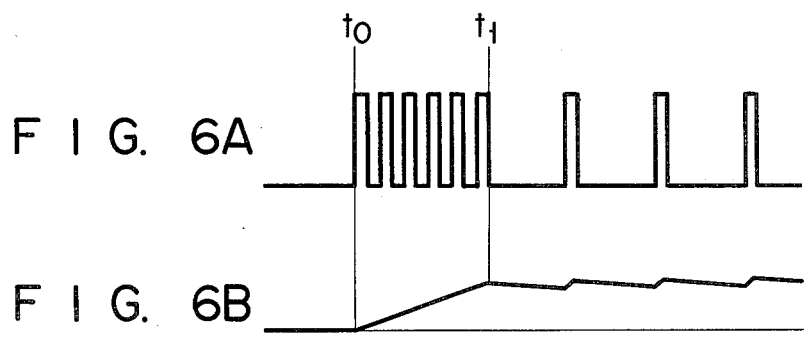

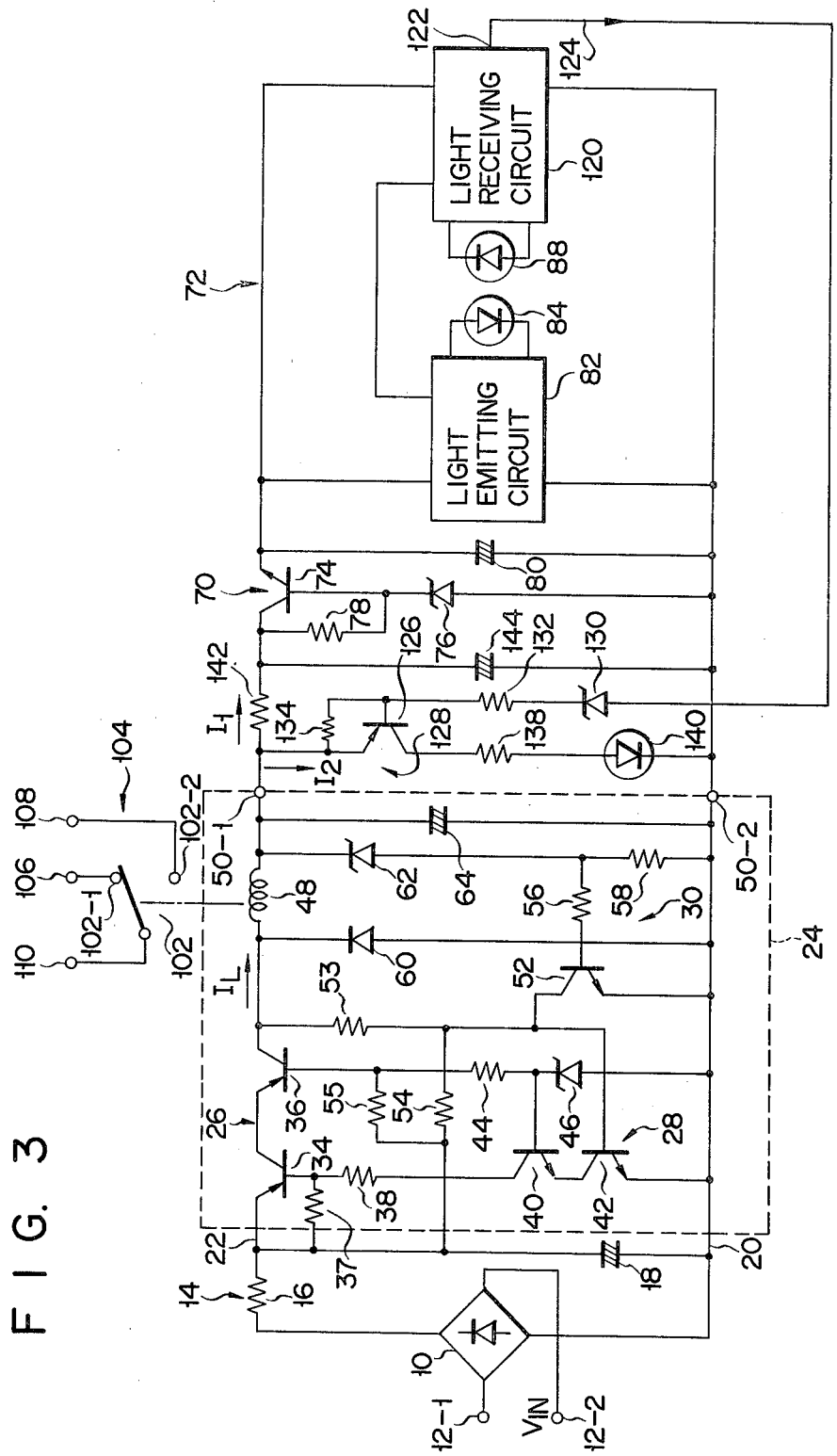
F I G. 3

APPARATUS FOR DETECTING AN OBJECT

BACKGROUND OF THE INVENTION

The present invention relates to a detector and, more particularly, a detector capable of detecting the presence of an object in non-contact manner by using radiation such as light beam.

An optical type detector wherein an object is detected by the change of light beam radiated, for example, can achieve high speed detection and has such preferable characteristic that non-contact detection can be achieved. Therefore, the field in which the optical type detector can be used has become wider including detections of number of goods on the goods shipping line, of liquid surface, of lable misalignment, etc. However, the power source section housed in the conventional optical type detector is designed to meet a preinformed power source. In the case where power source standards under which the optical type detector is used are different from one another, the optical type detector housing the power section designed to be suitable for a power source standard can not be used under other power source standards. The voltage of commercial power is different in almost every country and a plurality of kinds of power source section must be therefore used to be suitable for any of power source standards in countries to which products are exported. As the result, it becomes necessary that a plurality of kinds of optical type detector even same in detection characteristic but having power source sections different from one another in power source standards must be prepared, thus causing product maintenance and stock adjustment to be extremely troublesome. In addition, the optical type detector having the power not be used under DC power source standard. Even if only a single detection characteristic is needed, therefore, the user feels extremely difficult in using his detector or must buy a new different detector when the power source standard now employed is changed.

Further, the power source section in the conventional optical type detector includes a transformer and is designed to be applicable to two kinds of AC power source of AC 100 V and AC 200 V. However, the power source input range of transformer is narrow. The transformer having a standard of AC 100/200 V±10%, for example, cannot be replaced by the one having a standard of AC 110/220 V±10%. Various transformers must be therefore arranged in the power source section to meet various voltage standards. In addition, it is difficult to make smaller the shape and weight of transformer itself. Therefore, the detector in which the transformer is incorporated becomes large in shape and heavy in weight. On the other hand, a power source section having no transformer but a voltage limiting element is sometimes employed in the detector to eliminate these drawbacks. However, this voltage limiting element is substantially equivalent to a resistor and consumes excessive energy for itself in operation. The efficiency of power source section is thus lowered and heat corresponding to the energy consumed by the voltage limiting element is generated.

SUMMARY OF THE INVENTION

An object of the present invention is to provide a small-sized detector applicable to external DC and AC power sources and voltage levels in a wide range.

A detector of the present invention includes input means connected to an external power source and transforming input voltage supplied from the power source to a predetermined DC voltage, detecting means for detecting an object to generate a predetermined electrical detection signal, and output means connected to the detecting means and performing switching operation responsive to detection signal to produce a detection output signal. A switching regulator means is arranged at output stage of the input means and serves to chop, at a given varying duty cycle, DC voltage applied from the input means. This switching regulator means to which the detecting means is connected comprises an inductive member, a drive section having at least two transistors connected in series with each other and performing switching operation, and a control section connected to the drive section to control the switching operation and having at least two transistors connected in series with each other, and at least one zener diode.

BRIEF DESCRIPTION OF THE DRAWINGS

FIG. 1 is an electrical circuit diagram showing the whole arrangement of one embodiment of optical type detector according to the present invention;

FIGS. 2A through 2C show wave forms in main positions of the embodiment shown in FIG. 1;

FIG. 3 is an electrical circuit diagram showing the whole arrangement of another embodiment of optical type detector according to the present invention;

FIGS. 4A through 4D show wave forms in main positions of the embodiment shown in FIG. 3;

FIGS. 6A and 6B show wave forms in main positions of the embodiment shown in FIG. 5.

DETAILED DESCRIPTION OF THE PREFERRED EMBODIMENTS

Figure 5:
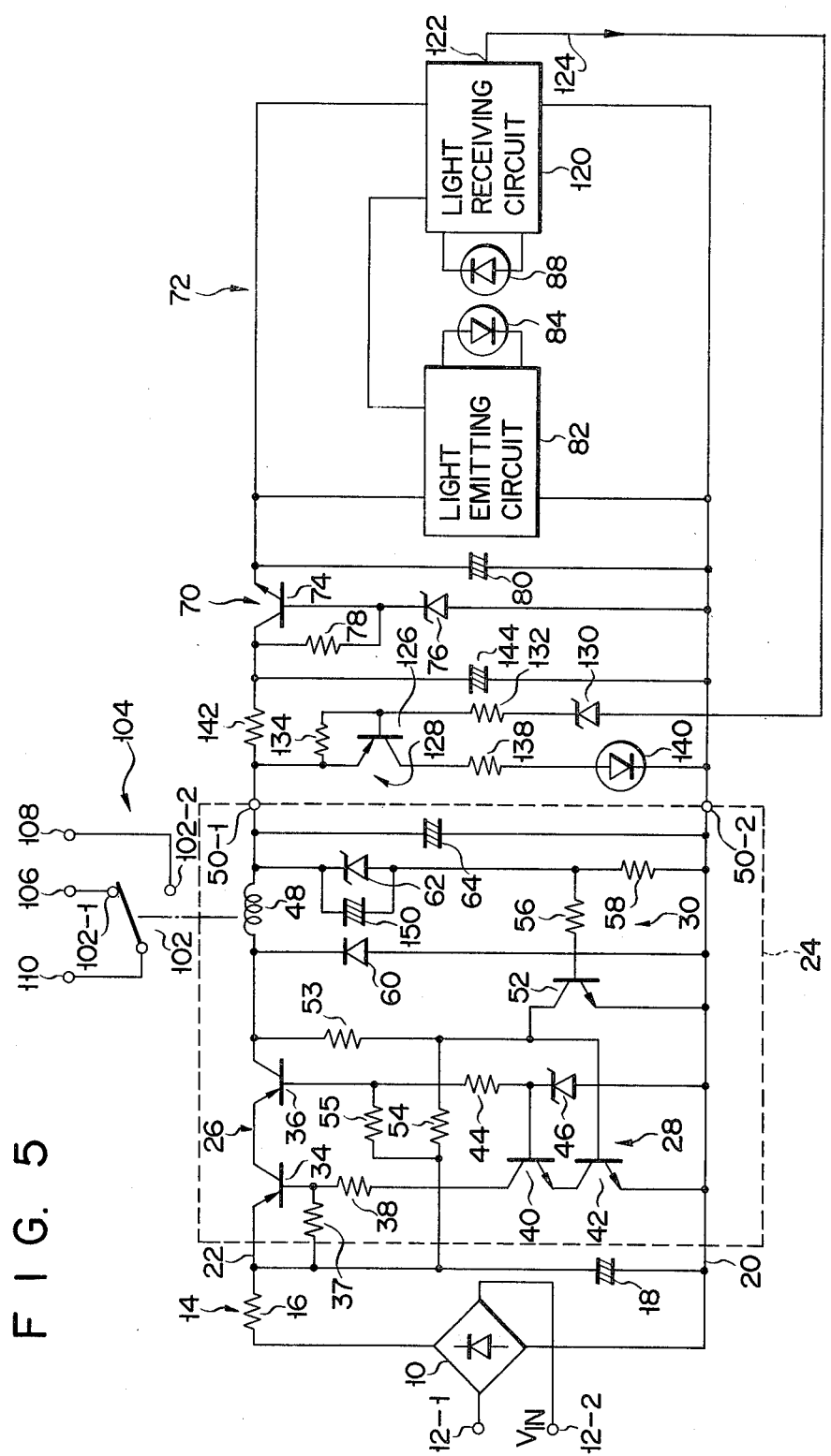
FIG. 5 is an electrical circuit diagram showing the whole arrangement of a still another embodiment of optical type detector according to the present invention.

FIG. 1 is a circuit diagram showing the whole of an embodiment of optical type detector according to the present invention. Input terminals of a bridge type full-wave rectifier circuit 10 are connected to power source input terminals 12-1 and 12-2, respectively. Output terminals of full-wave rectifier circuit 10 are connected to first and second lines 20 and 22, respectively, through a smoothing circuit 14 which consists of a resistor 16 and a capacitor 18. The rectifier circuit 10 and smoothing circuit 14 supply a DC voltage across the first and second lines 20 and 22, a potential level of the second line 22 is higher than that of the first line 20, disregarding AC or DC of power supply $V_{IN}$.

Reference numeral 24 designates a switching regulator of chopper type. This switching regulator 24 is provided with a drive switching section 26, a control switching section 28, a comparing section 30 and an output section 32. The drive switching section 26 includes transistors 34 and 36 of PNP type. The transistor 34 is connected at the emitter electrode thereof to the second line 22 and at the collector electrode thereof to the emitter electrode of second transistor 36. A resistor 37 is provided which serves to prevent the transistor 34 from floating between the base and emitter electrodes thereof even when base current is zero. The base electrode of transistor 34 is connected via a resistor 38 to the collector electrode of an NPN type transistor 40 which is included in the control switching section 28. The emitter electrode of transistor 40 is connected to the first line 20 through the collector and emitter electrodes of an NPN transistor 42. On the other hand, the base electrode of PNP transistor 36 is connected to the base electrode of NPN transistor 40 through a current feedback resistor 44. The base electrode of transistor 40 is connected via a zener diode 46 to the first line 20. The collector electrode of transistor 36 is connected via an inductor 48 to one output terminal 50-1 of switching regulator 24.

The collector electrode of an NPN type transistor 52 in the comparing section 30 is connected to the base electrode of transistor 42 in the control switching section 28, to the collector electrode of transistor 36 in the drive switching section 26 through a resistor 53, and to the second line 22 through a resistor 54, respectively. The common connection point between the resistor 54 and the second line 22 is connected via a resistor 55 to the base electorde of transistor 36 wherein the resistance value of resistor 55 is much larger than that of resistor 44.

An NPN transistor 52 is connected at the emitter electrode thereof directly to the first line 20 and at the base electrode thereof to the first line 20 through two resistors 56 and 58, said resistor 56 serving as a current feed-back resistor. A diode (or so-called flywheel diode) 60 is arranged between the first line 20 and the common connection point of collector electrode of transistor 36 and one terminal of inductor 48. A zener diode 62 is arranged between the common connection point of other terminal of inductor 48 and output terminal 50-1 and that of resistors 56 and 58.

The output section 32 consists of, for example, a smoothing capacitor 64, which is connected between the output terminals 50-1 and 50-2 of switching regulator 24.

In the switching regulator 24 having such arrangement as described above, the zener voltage $V_{Z1}$ of zener diode 46 is set about half the maximum voltage of input voltage $V_{IN}$ supplied to input terminals 12-1 and 12-2 of full-wave rectifier circuit 10. In this embodiment, the maximum power source voltage was set at 400 V at the peak. Because it is not so effective that the maximum power source voltage is set at a voltage over 400 V, while almost all possible use conditions will meet a set of 400 V, considering voltage standard of every country in the world. Therefore, the zener diode 46 employed had zener voltage characteristic of about 200 V about half the maximum power source voltage. The maximum rating of withstand voltage between collector and emitter electrodes of each of two transistors 34, 36 in the drive switching section 26 and each of two transistors 40, 42 in the control switching section was set theoretically at a voltage over 200 V, preferably over 250 V. It is certain that the maximum rating of full-wave rectifier circuit 10, smoothing capacitor 18 and the like were set over their respective given levels.

At a stage following the switching regulator 24 are arranged a constant voltage circuit 70 and a detecting section 72. The constant voltage circuit 70 is formed in well-known fashion including an NPN transistor 74, a zener diode 76, a resistor 78 and a smoothing capacitor 80, for example. The detecting section 72 includes a well-known light-emitting circuit 82 which is provided with a light beam-generating element such as light-emitting diode (LED) 84. The detecting section 72 further includes a well-known light-receiving circuit 86 which is provided with a light-receiving element such as photodiode 88. The led 84 is arranged adjacent to the photodiode 88 and the detecting section 72 is adapted to achieve a so-called reflection type optical detection. The light-emitting circuit 82 consists of an oscillator circuit which includes a multivibrator (not shown), and this oscillator circuit causes the LED 84 to be flickered every certain predetermined cycle. When an object to be detected is present in the detection area of detection section 72, light beam emitted from the LED 84 is reflected by the object, and goes back to the photodiode 88. When the intensity of this reflected light beam exceeds the predetermined light receiving level of photodiode 88, a detection signal 90 of "HIGH" level is generated from a terminal 89 of the light-receiving circuit 86. The detection signal 90 is supplied through a resistor 93 to the base electrode of an NPN transistor 92. The collector electrode of transistor 92 is connected via an exciting coil 94 to one output terminal 50-1 of switching regulator 24. A surge killer diode 96 and a series circuit comprising a resistor 98 and a display LED 100 are connected in parallel to this coil 94. A double-throw switch 102, for example, is arranged so as to associate in operation with the exciting coil 94. A relay section 104 is formed by these switch 102 and coil 94. A normally closed contact 102-1 of the switch 102 is connected to a first relay-terminal 106 while a normally open contact 102-2 thereof to a second relay-terminal 108. The movable contact of the switch 102 is connected to a common relay-terminal 110. Associating with the coil 94 powered, the switch 102 is changed over from the terminal 102-1 to the one 102-2. The switch 102 is returned to its initial position when power supply to the coil 94 is stopped. To add more, the emitter electrode of transistor 92 is connected to the other output terminal 50-2 of switching regulator 24. A resistor 112 is connected between the base and emitter electrodes of transistor 92.

It will be now described how this embodiment of optical type detector thus arranged operates.

Let us consider a case where the maximum peak level of power source voltage $V_{IN}$ supplied to the input terminals 12-1 and 12-2 of full-wave rectifier circuit 10 is lower than the zener voltage $V_{Z1}$ of zener diode 46. When no object is present in the detection area of detecting section 72, the voltage of "LOW" level is developed on the terminal 89 from light-receiving circuit 86, as described above, thereby becoming NPN transistor 92 nonconductive. Therefore, only the detecting section 72 is made response as load of switching regulator 24. When the transistor 52 in the switching regulator 24 is also kept nonconductive at this time, a base current is supplied from the smoothing circuit 14 to the transistor 42 via the resistor 54, thus rendering the transistor 42 conductive. In accordance with the operation of transistor 42, a base current is also supplied from the smoothing circuit 14 to the transistor 40 via resistors 55 and 44 in this order, thus rendering the transistor 40 conductive. The zener diode is in a cut-off state since power source voltage $V_{IN}$ is lower than the zener voltage $V_{Z1}$ of zener diode 46.

When transistors 42 and 40 in the control switching section 28 become conductive successively, base current is supplied through the resistor 38 to the transistor 34 in the drive switching section 26 to make the transistor 34 conductive. Base current corresponding to current flowing through the base electorde of transistor 40 is also supplied to the transistor 36, thus rendering the transistor 36 conductive. As the result, the base current of transistor 36 is positively fed back to the base electrode of transistor 40 through the resistor 44. On the other hand, on response from to the transistor 36 rendered conductive, a predetermined voltage is generated at the collector electrode of transistor 36. Current is therefore positively fed back to the base electrode of transistor 42 in the control switching section 28 through the resistor 53. The base current of transistor 34 in the drive switching section 26 is forcedly increased due to this positive current feed-back to thereby make the conductivity of transistor 34 high. This serves to further increase the base current of transistor 36. As the result, transistors 34 and 36 are brought into good conductivity for a short time period, that is, the switching speed of drive switching section 26 is made high.

During the time period when transistors 34 and 36 are left conductive, current is allowed to flow through the inductor 48 to charge the capacitor 64 in the output section 32. When voltage appearing between both ends of capacitor 64 is increased to exceed a voltage level corresponding to the sum of zener voltage $V_{Z2}$ of zener diode 62 and bias voltage enough to make the transistor 52 conductive, the transistor 52 is rendered conductive. Base electrode potential of transistor 42 in the control switching section 26, therefore, becomes substantially equivalent to that of first line 20, which makes transistor 42 to be nonconductive (OFF). This causes the transistor 40 and two transistors 34, 36 in the drive switching section 26 to quickly turn off in this order. Power energy stored in the inductor 48 during the conductive period of transistors 34 and 36 is supplied as load current to the detecting circuit 72 through the diode 60 and the like. This causes the capacitor 64 to be discharged to decrease the voltage appearing between both ends of capacitor 64. When the voltage of capacitor 64 becomes lower than a voltage level corresponding to the sum of zener voltage $V_{Z2}$ of zener diode 62 and the lowest voltage necessary to keep the transistor 52 conductive, the transistor 52 is rendered nonconductive. Therefore, transistors 42 and 40 in the control switching section 28 become conductive again and such process as described above will be repeated.

DC voltage caused to appear between first and second lines 20 and 22, owing to the above-described operation of switching regulator 24, is chopped by transistors 34 and 36 in the drive switching section 26. Chopper output voltage having a wave form shown in FIG. 2A is thus generated at the collector electrode of transistor 36. Only load current to the detecting circuit 72 is generated for this time period at the output stage of switching regulator 24. Therefore, the speed at which voltage appearing between the both ends of capacitor 64 is decreased is made relatively slow. At the result, providing that the time at which the object appears in the detection area of the detecting section 72 is represented by $t_2$, the length of chopping period $t_1-t_2$ becomes relatively long.

When the object appears in the detection area at the time $t_2$ and the light-intensity received by photodiode 88 exceeds the predetermined level, detection signal 90 is generated from the light receiving circuit 86 as shown in FIG. 2B wherein the period of signal 90 is represented by T. When it receives the detection signal 90, the transistor 92 is made conductive and the exciting coil 94 is thus energized. Associating with the coil 94, the movable contact of switch 102 is changed over to the normally open contact 102-2 (FIG. 2C shows a wave form of ON-OFF state between the terminal 108 and the common terminal 110 which are connected by the switch 102). Therefore, detection output representing the presence of object can be obtained between terminals 108 and 110. The display LED 100 is also powered to turn on light at the same time, so that the operator can recognize the appearance of object by seeing the lighted LED 100. Output current of switching regulator 24 increases in this case. The speed at which voltage appearing between both ends of capacitor 64 at the time when two transistors 34 and 36 in the drive switching section 26 are nonconductive is made high. The length of chopping period determined by transistors 34 and 36 is shortened. The switching regulator 24 thus serves to chop the input voltage $V_{IN}$ at a varying duty cycle based on load requirements of regulator 24. Therefore, output voltage of regulator 24 is adjusted to a constant level previously determined.

In the case as described above, the lowest power source voltage inputted to the full-wave rectifier circuit 10 is substantially equal to a total voltage obtained by adding the rating voltage of relay-coil 94 to forward voltage drop component in the rectifier circuit 10, voltage drop component in the resistor 16 and inductor 48, and voltage saturated between the collector and emitter electrodes of transistors 34 and 36. According to this embodiment, the total value was 3 V and rating voltage of the relay-coil 94 was about 12 V. Therefore, the lowest value of power source voltage $V_{IN}$ was enough in this case when it was at least 15 V.

Let us now consider a case where the maximum peak level of power source voltage $V_{IN}$ supplied to the input terminals 12-1 and 12-2 of full-wave rectifier circuit 10 is higher than zener voltage $V_{Z1}$ of zener diode 46. When input voltage $V_{IN}$ exceeds zener voltage $V_{Z1}$, the zener diode breaks down. The base potential of transistor 40 in the control switching section 28 is controlled not to exceed zener voltage $V_{Z1}$. A voltage over the difference between the zener voltage $V_{Z1}$ and the voltage $V_{BE}$ between the base and emitter electrodes of transistor 40 is prevented to be applied across the collector and emitter electrodes of transistor 42. Although the voltage $V_{BE}$ of transistor 40 is an extremely small, the voltage between the collector and emitter electrodes of transistor 42 is substantially equivalent to zener voltage $V_{Z1}$. On the other hand, voltage corresponding to the difference between input voltage $V_{IN}$ and zener voltage $V_{Z1}$ is applied between the collector and emitter electrodes of transistor 40. Other process is same as the first case described above except the operation of zener diode 46.

According to this embodiment of optical type detector of the present invention, the full-wave rectifier circuit 10 followed by the smoothing circuit 14 and the switching regulator 24 are provided in a power input section. Therefore, the optical type detector is operated from AC or DC power and allows so-called nonpolarized connection particularly relative to the DC power source. The maximum allowable power voltage to be used was set at 400 V and divided by two transistors which are connected in series with each other. The zener voltage $V_{Z1}$ of zener diode 46 was set at 200 V substantially half the power source voltage. Even if power source voltage of 400 V is supplied at maximum, therefore, only voltage component of about 200 V is equally applied between the collector and emitter electrodes of transistors 34 and 36. Rating voltage of transistors 34 and 36 was set at 250 V as described above. The small-sized and cheap resin-molded small signal transistor can be employed enough as a transistor having such anti-resistance value. This therefore contributes to making the device small-sized and reducing the cost. When transistors 34 and 36 are cut off, the base potential of transistor 36 is:

$$(V_{IN} - V_{Z1}) \times \frac{R_1}{R_1 + R_2} + V_{Z1}$$

wherein, $V_{IN}$: the peak voltage of power inputted, $V_{Z1}$: zener voltage of zener diode 46, $R_1$: resistance value of resistor 44, and $R_2$: resistance value of resistor 55. Since $R_2 >> R_1$ as described above, said base potential becomes a little higher than that of zener voltage $V_{Z1}$. Therefore, even when the power source voltage reaches 400 V, each of voltages between the collector and emitter electrodes of transistors 34 and 36 becomes about 200 V substantially half the power voltage. When the withstand voltage of each of transistors is set at 250 V, it can surely prevent undesired phenomenon such as breakdown. As described above, the drive section 26 and control switching section 28 can withstand a high voltage, which makes the optical type detector operate properly from at any voltage in a considerably wide range. For instance, in this embodiment, the arrangement can practically realize an optical type detector to be operated from at any voltage ranging from 24 to 240 volt disregarding AC or DC. Since the optical type detector is versatile like this in the kind and voltage of power source used, only a single unit of this optical type detector can meet the requirements in most countries in which power source ratings are different from one another. In addition, the device can be small-sized because no transformer is employed, and efficiency can be enhanced because there is no generation of heat.

Further, according to this embodiment of the present invention, transistors 34 and 36 in the drive switching section 26 could be brought into good conductivity for a short while by arranging the control switching section 28 which includes transistors 40 and 42 in the switching regulator 24. Therefore, as compared with the conventional switching regulator, the switching speed of drive switching section 26 can be made higher. The voltage conversion efficiency of regulator 24 could be thus improved in this embodiment of the present invention.

FIG. 3 shows another embodiment of optical type detector according to the present invention. The same parts as those in the first embodiment of the present invention shown in FIG. 1 are represented by the same reference numerals and description on these parts will be omitted.

The light receiving circuit 120 in the detecting section 72 is arranged as the potential at the output terminal 122 is "HIGH" level when the light intensity received by the photodiode 88 is lower than a predetermined level. Detection signal 124 generated from the light receiving circuit 120 is supplied via a zener diode 130 and a resistor 132 to the base electrode of a PNP type transistor 126 which is included in an impedance converting section 128. The emitter electrode of transistor 126 is connected to one output terminal 50-1 of switching regulator 24. A resistor 134 is connected between the emitter and collector electrodes of transistor 126, whose collector electrode is connected via a resistor 138 and a display LED 140 to the other output terminal 50-2 of switching regulator 24. A smoothing circuit consisting of a resistor 142 and a smoothing capacitor 144 is arranged at the output stage of impedance converting section 128. The smoothing circuit serves as a low-pass filter for the constant voltage circuit 70 arranged at the post-stage of smoothing circuit.

The relay switch 102 is adapted to achieve switching operation associating with the inductor 48 arranged in the switching regulator 24 in this second embodiment of the present invention. In other words, this inductor 48 also functions as an exciting coil for the switch 102. When current larger than a predetermined operating current $I_m$ (FIG. 4C) flows to the inductor 48, the movable contact piece of realy switch 102 is changed over from the normaly closed contact 102-1 to the normally open contact 102-2. While, when a current smaller than holding current $I_h$ which is lower than operating current $I_m$ flows to the inductor 48, the relay switch 102 is returned to its initial position. A current larger than the operating current $I_m$ flows into inductor 48 in regulator 24 when the impedance of impedance converting section 128 decreases as transistor 126 becomes conductive. In addition, current dissipation in detecting section 72 is set smaller than holding current $I_h$ of relay section 104.

In the case where no object is present in the detection area of the detecting section 72, "HIGH" level voltage is generated at the output terminal 122 of light receiving circuit 120, as described above. The transistor 126 becomes therefore nonconductive. The impedance converting section 128 has substantially limitless impedance and the switching regulator 24 outputs load current $I_1$ corresponding to consumption current of detecting section 72 and smaller than holding current $I_h$. The relay section 104 performs no switching operation while the chopping period of regulator 24 becomes longer as shown between times $t_1-t_2$ in FIG. 4A.

When an object appears in the detection area, detection signal 124 of "LOW" level is generated from the light receiving circuit 120 as shown in FIG. 4B. The transistor 126 is rendered conductive responsive to the signal 124, and current $I_2$ flows through the display LED 140. The display LED 140 is thus put on and the operator can recognize the presence of object by seeing the lighted LED 140. Since the switching regulator 24 outputs current ($I_L = I_1 + I_2$) having a wave form shown in FIG. 4C, the chopping period of regulator 24 becomes shorter as shown between times $t_2-t_3$ in FIG. 4A. In addition, current flowing to the inductor 48 exceeds the current $I_m$ in level to, thereby, cause the switch 102 of relay section 104 to be changed over to the normally open contact 102-2. When the object becomes disappeared from the detection area at the time $t_3$ in FIG. 4A, voltage at the output terminal 122 of light receiving circuit 120 becomes of "HIGH" level again. Such process as described above will be repeated thereafter. According to this process, detection output shown in FIG. 4D and representing whether or not the object is present could be obtained through the relay section 104.

Pulsating load current caused by the chopped output signal of switching regulator 24 flows to the inductor 48. The operation of the relay section 104 depends on the average value of the load current. Although chopping cycle of regulator 24 usually ranges from several tens μsec to several handreds μsec, the response delay time of relay section 104 exceeds at least several msec. Thus there is no warranty of the relay operation fail from the pulsating load current, and no problem on operation.

According to the second embodiment of the present invention shown in FIG. 3 and as described above, the inductor 48 in the switching regulator 24 also functions as an exciting coil for driving the double-throw switch 102 in the realy section 104. It is, therefore, unnecessary that an exclusive exciting coil (which corresponds to the component 94 in FIG. 1) is arranged at the output stage of regulator 24. Consequently, the number of parts used in the optical type detector can be further reduced, thus allowing the device to be smaller-sized and the cost to lowered. In addition, load current flowing to the inductor 48 was controlled by the impedance converting section 128 and the display LED 122 was connected in series to the impedance converting section 128. Therefore, operation display output can also be replaced by current (or control output) flowing to the impedance converting section 128.

If the resistance value of resistor 138 in the impedance converting section 128 is appropriately changed as occasion demands in this second embodiment, a relay section different in rating and having a desired sensitive current value can be operated by keeping the output voltage of switching regulator 24 constant.

FIG. 5 shows a further embodiment of optical type detector according to the present invention. When high voltage is sharply applied to input terminals 12-1 and 12-2 in the already-described two embodiments under the condition that charge voltage of smoothing capacitor 64 is about zero, most of output current flowing through the inductor 48 is consumed as charge current for the smoothing capacitor 64. From the reason, when input power is turned on, a considerably high current (rush current) determined by the capacity of the capacitor 64 and power supply voltage immediately flows through the transistors 34 and 36 in drive-switching section 26, which might happen to break said transistors 34 and 36 down. For the purpose of enhancing the stability of said output voltage in the switching regulator 24, therefore, it is necessary that the capacity of smoothing capacitor 64 and the current capacity of transistors 34 and 36 are large. However, it is undesirable for capacitor 64, and transistors 34 and 36 to be large for the purpose of the miniaturization and cost-down of the detector.

Taking these matters into consideration, a further improvement has been added to the embodiment shown in FIG. 5 so as to suppress the high current (rush current) when power is turned on. A capacitor 150 for the output stage is arranged parallel to the zener diode 62 in the switching regulator 24. When power source voltage is applied between input terminals 12-1 and 12-2, the charge of capacitor 150 and smoothing capacitor 64 is about zero and transistor 52 is in cut-off state at the initial time point $t_0$. Therefore, the base current is supplied from smoothing circuit 14 to transistor 42 through resistor 54, and transistor 42 is thus made conductive. In response to the transisor 42 being conductive, the transistor 40 is also rendered conductive according to the process as already described. The transistors 34 and 36 in the drive switching section 26 are made conductive successively. The current supplied from the smoothing circuit 14 flows through transistor 34, 36 and the inductor 48. Most of this current is fed into capacitor 150 and smoothing capacitor 64 as a charge current.

Charge current for the capacitor 150 is fed via a resistor 56 to the base electrode of transistor 52. When this base current becomes in level higher than a predetermined level, transistor 52 is made conductive, which makes transistors 42, 40, 34 and 36 to be in a cut-off in this order. As the result, charging for the capacitor 150 is broken off. No base current is then fed to transistor 52, which becomes thus nonconductive. Similar to the above, transistors 42, 40, 34 and 36 are made conductive sequentially, the charge current flows into the capacitors 150 and 64, such process is repeated thereafter, and a wave form shown in FIG. 6A appears at the common connection between the collector electrode of transistor 36 and the inductor 48. A little charge is stored in the capacitor 150 on the previous process. The output voltage of capacitor 150 rises corresponding to the amount of charge stored as shown in FIG. 6B when the process is repeated.

The output voltage of capacitor 150 reaches the potential at the sum of zener voltage $V_{Z2}$ of zener diode 62 and bias voltage enough to make the transistor 52 conductive at the time $t_1$ in FIG. 6A. The switching operation of transistor 52 is controlled by comparing the output voltage of capacitor 150 with the zener voltage $V_{Z2}$ of zener diode 62, independent from the charging current to capacitor 150. In other words, the switching regulator 24 is shifted to steady-operating state. The subsequent process is similar to that described in the first and second embodiments and will not be described.

According to the third embodiment of optical type detector, when the power for switching regulator 24 is turned on, transistors 34 and 36 in drive switching section 26 are conductive and a charging current flows into transistor 52. This charge current is fed back to transistors 34 and 36 through the transistor 52 and these transistors 34 and 36 carry out ON-OFF operations periodically, so that output voltage of capacitor 150 rises gradually as shown in FIG. 6B. Transistors 34 and 36 are, therefore, surely prevented from their breakdown caused by excessive high current. The time period $t_0-t_1$ shown in FIG. 6A can be adjusted by capacitances of smoothing capacitor 64 and capacitor 150 and these capacitances may be appropriately set considering the stability of output voltage of capacitor 150.

Although the present invention has been shown and described with reference to particular embodiments, various changed and modifications obvious to a person skilled in the art are deemed to lie within the spirit, scope and contemplation of the present invention.

What we claim is:

1. An apparatus for detecting an object to be detected, said apparatus comprising:
   (a) input means, having outputs respectively connected to first and second lines, for connection to an external power source and for transforming input voltage supplied from the external power source to a predetermined DC voltage;
   (b) switching regulator means, connected to said input means through the first and second lines, for chopping the DC voltage applied from said input means at a given duty cycle, said switching regulator means including
      (i) an inductive member having at least one end,
      (ii) a drive section having at least two transistors connected in series with each other and being arranged between the second line and the one end of said inductive member to perform switching operation, and
      (iii) a control section connected to said drive section to control the switching operation of said drive section and having at least two transistors connected in series with each other and at least one zener diode;

(c) detecting means, connected to said switching regulator means so as to be supplied with power from said switching regulator means, for detecting the object to generate an electrical signal; and (d) output means, connected to said detecting means, for carrying out switching operation in response to said electrical signal and for producing a detection output corresponding to said electrical signal.

2. An apparatus according to claim 1, wherein said drive section of said switching regulator means includes first and second transistors connected in series with each other and each having a first conductivity type and at least base and collector electrodes, while said control section includes third and fourth transistors connected in series with each other and each having a second conductivity type and at least a base electrode, the series circuit of said third and fourth transistors being connected between the first line and the base electrode of said first transistor, and the base electrodes of said third and fourth transistors being connected to the collector and base electrodes of said second transistor, respectively, and the zener diode is arranged between the base electrode of said fourth transistor and said first line.

3. An apparatus according to claim 2, wherein the input voltage supplied to said input means has a maximum allowable level previously determined and said zener diode has a zener voltage substantially half the maximum allowable level.

4. An apparatus according to claim 2, wherein said switching regulator means further comprises a comparing section, said comparing section including a fifth transistor having a collector electrode connected to the second line and the collector electrode of said second transistor, emitter electrode connected to said first line, base electrode, and a second conductivity type; and a zener diode connected between the base electrode of said fifth transistor and the other end of said inductive member.

5. An apparatus according to claim 4, wherein said switching regulator means further includes a capacitive member connected in parallel with the zener diode of said comparing section, and said capacitive member is supplied with power and charged by said input means through the first and second transistors and the inductive member.

6. An apparatus according to claim 1, wherein said input means includes a bridge type full-wave rectifier circuit.

7. An apparatus according to claim 1, wherein said output means includes an indication means for generating a visible light responsive to said detection signal, and a relay means for performing switching operation responsive to said electrical signal and producing a signal corresponding to said detection output.

8. An apparatus according to claim 1, wherein said output means includes impedance converting means, connected to said switching regulator means and detecting means, for converting its impedance in response to said electrical signal to control current flowing to said inductive member; and relay means for performing switching operation associating with said inductive member arranged in said switching regulator means and for producing a signal corresponding to said detection output.

9. An apparatus according to claim 8, wherein said output means further includes a display means for emitting visible light and said impedance converting means also serves to drive said display means by converting its impedance.

* * * * *